United States Patent Office 2,875,241
Patented Feb. 24, 1959

2,875,241

NEW POLYHYDROXY ALCOHOLS AND POLYESTERS AND NOVEL PROCESS OF PREPARING SUCH COMPOUNDS

Robert E. Miller, Dayton, Ohio, and George E. Bennett, Glendale, Mo.; said Bennett assignor to Monsanto Chemical Company, St. Louis, Mo., a corporation of Delaware No Drawing. Application December 27, 1955
Serial No. 555,295

12 Claims. (Cl. 260—488)

This invention provides a new class of chemical compounds, i. e., a new class of polyhydroxy alcohols. The invention also provides a new class of esters of the new polyhydroxy alcohols.

The invention is also directed to a new method of preparation of polyhydroxy alcohols and esters of such polyhydroxy alcohols.

The new compounds of our invention are the condensation products formed by the Guerbet reaction of glycols containing more than three carbon atoms, the condensation taking place on a methylene group (—$CH_2$—) adjacent to a carbinol carbon atom to produce an alkylol substituted higher glycol in which all of the carbon atoms are bound by carbon-to-carbon bonds and the alkylol groups are at least two carbons removed from the carbinol groups of the higher glycol, which higher glycol has a straight chain of at least 7 carbon atoms. The new compounds of our invention can be formed by condensing together 2 or 3 or more molecules of a glycol which has at least 4 carbon atoms in a straight chain. The new compounds of our invention are alpha, omega-glycols containing at least seven carbon atoms in a straight chain, the stated glycols having at least one alkylol (hydroxyalkyl-) substituent, all such alkylol substituents being on different carbon atoms, these different carbon atoms being non-adjacent to the carbinol carbon atoms of the glycols. It is preferred that the alkylol groups have 1 to 8 carbon atoms, as is the case when the starting glycol has no more than ten carbon atoms. It is still more preferred that the alkylol groups contain 1 to 4 carbon atoms, as will be the case when the starting glycol has 4 to 6 carbon atoms.

When our new compounds are produced by the condensation of more than two molecules of a starting glycol, they may exist as various isomers, or mixtures of isomers. For example, the condensation of three molecules of 1,4-butanediol produces the following:

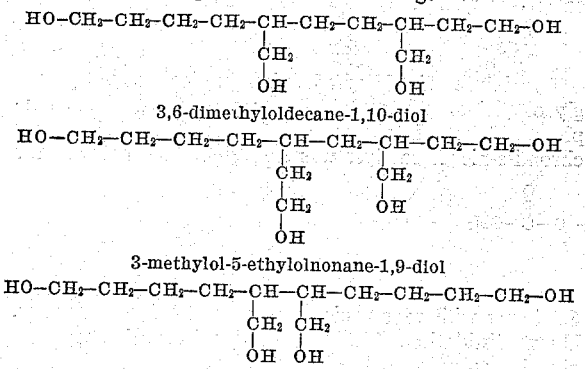

3,6-dimethyloldecane-1,10-diol 3-methylol-5-ethylolnonane-1,9-diol 5,6-dimethyloldecane-1,10-diol, and
3,8-dimethyloldecane-1,10-diol All of these isomers have alkylol substituents on different carbon atoms which are not adjacent to the carbinol carbon atoms of the alpha,omega-glycol products, and all of the carbon atoms are bound by carbon-to-carbon bonds.

Some of the preferred compounds of our invention conform to the general formula:

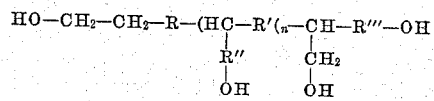

in which R is an alkylene group of 2 to 4 carbon atoms, R' is an alkylene group of 0 to 4 carbon atoms and when in the range of 2 to 4 carbon atoms R' is equal to R, and R" is a methylene group except when R' is a methylene group, in which case R" is equal to R, and R''' is equal to R except when R' is zero and $n$ is 1, in which case R''' is an alkylene group containing two more carbon atoms than R, and $n$ is any whole number from and including 0 to 1.

The new polyhydroxy compounds of our invention can be esterified with acids to produce a new class of esters. Any of the alkylol alkanediols can be esterified with any esterifying acid. It is preferred to use organic acids for the esterification, particularly lower aliphatic mono-carboxylic acids, e. g., acetic acid, propionic acid, other organic acids, such as benzoic acid and caproic acid, etc., can also be used. The esterification of any of our novel alkylol alkanediols produces novel esters; the alkylol alkanediols can be partially or completely esterified, although ordinarily the esterification is nearly complete. The new esters are acyloxyalkyl-alpha,omega-di(acyloxy)-alkanes containing at least 7 carbon atoms in the alkane group in a straight chain, and containing the acyloxyalkyl

groups on different carbon atoms which are different from and non-adjacent to the acyloxy substituted carbon atoms. It is preferred that the acyloxy and acyloxyalkyl groups be acetoxy and acetoxyalkyl groups, respectively. It is preferred that our esters have the formula:

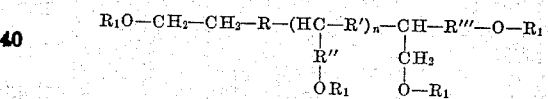

in which R, R', R", R''', and $n$ have the meanings set forth above in the formula for the alkylol alkanediols, and in which $R_1$ is a lower aliphatic acyl group, preferably an acetyl group.

If, in the above formula, $R_1$ is selected from the group consisting of hydrogen and lower acyl groups, the formula represents both the new polyhydroxy alcohols, and the new aliphatic acid esters of these alcohols.

The new process of my invention involves the reaction of glycols containing at least three carbon atoms in a Guerbet type reaction. While the Guerbet reaction is a well-known procedure for the condensation of monohydroxy alcohols to higher molecular weight monohydroxy alcohols, it has not heretofore been applied to the condensation of polyhydric alcohols containing at least three carbon atoms to prepare alkylol alkanediols. To obtain the desired condensation products, it is necessary that at least one of the alcoholic groups in the glycol be a primary alcoholic group and that none of the alcoholic groups be tertiary. It is preferred that the glycol have two primary alcoholic groups, i. e., that an alpha, omega-glycol be used in order to obtain glycols having one or more alkylol substituents. Any glycol containing a primary alcoholic group can be used, so long as it has a methylene group (—$CH_2$—) attached to a carbinol carbon atom, and also attached to another carbon atom or hydrogen; i. e., the glycol must have a methylene group which is not part of a carbinol group, attached to a carbinol carbon atom. The lowest such glycols are 1,2-propanediol and 1,3-propanediol. The present process is applicable to glycols having three or more carbon atoms. It is preferred to use glycols of 3 to 10 carbon atoms, and still more preferred to use glycols of 3 to 6 carbon atoms. The glycols can have either straight or branched chains, so long as they have the required methylene group attached to the carbinol carbon atom, and so long as there is at least one primary carbinol group, and there are no carbinol groups higher than secondary carbinol groups. The glycols can be substituted by groups which do not interfere with or take part in the reaction to produce unwanted products. The glycols can be substituted by hydroxyl groups, although in some cases this produces a mixture of condensation products because of the presence of a plurality of methylene groups attached to carbinol carbon atoms, which methylene groups are in non-equivalent positions in the molecule.

The Guerbet condensation of alcohols is well known to the organic chemist. Any of the Guerbet condensation conditions which are used with alcohols can be used in our condensation of glycols to alkanetriols, alkanetetraols, etc. However, in order to avoid decomposition, cyclization, excessive polymerization, etc., it is preferred to use mild Guerbet conditions. It is also preferred to use special procedures to separate the polyhydric alkanol products from the reaction mixture as there is excessive degradation of the product when separation by ordinary distillation is attempted. We have found that the polyhydroxy products can be esterified and then separated by distillation. The distilled esters are then saponified by known procedures to regenerate the desired polyhydroxy alkanols.

The following examples illustrate certain preferred embodiments of our invention.

Example 1

In a round-bottom flask fitted with a condenser and a Dean-Stark water trap, 609 grams (6.7 moles) of 1,4-butanediol, 26.5 grams of tripotassium phosphate, 10.1 grams of 1:1 copper chromite-nickel and 40 cc. of toluene were stirred and refluxed at 159–173° C. at atmospheric pressure for 12 hours with azeotropic removal of 24 cc. of water. The mixture was filtered and distilled, 200.5 grams of 1,4-butanediol, B. P., 128–148° C./25 mm. Hg being recovered. A residue of 339 grams remained. The undistilled residue was acetylated with 404 grams (4 moles) of acetic anhydride at 140–150° C. for 2 hours. The acetylation was conducted by charging the residue to a flask equipped with a stirrer and condenser, and adding the acetic anhydride dropwise while stirring and heating the mixture at atmospheric pressure after the addition was complete. The unreacted anhydride was stripped off in vacuo, and the remaining liquid was stirred for 0.5 hour with 400 cc. of water, extracted with ether, the ether extract washed with carbonate solution and then with water and dried. The ether was stripped off and the material distilled to give 195.5 grams of B.P. 87–93° C./3 mm. which was 1,4-butanediol diacetate and 56.5 grams of B. P. 165–180° C./3 mm., $n_D^{25}$ 1.4528–32 which was a di-(acetoxymethyl)-1,10-diacetoxydecane, which can be represented by the formula:

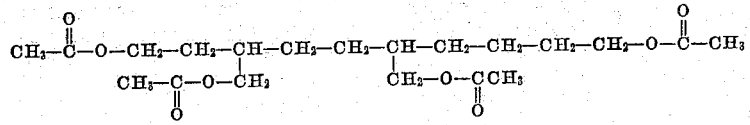

The following higher boiling fractions were also obtained: 39.5 grams, B. P. 198–211° C./3 mm., $n_D^{25}$ 1.4631, and 19.5 grams, B. P. 225–235° C./3 mm., $n_D^{25}$ 1.4722, as well as 62 grams of residue. These higher boiling materials are considered to be the acetates of products resulting from the condensation of four or more molecules of the glycols, although the residue also contains some polymerization and decomposition products. The tetra-acetylated dimethyloldecane-1,10-diol of B. P. 165–180° C./3 mm. Hg had the following analysis: Calcd. for $C_{20}H_{34}O_8$: C, 59.80; H, 8.52. Found: C, 59.18; H, 8.61. This tetraacetate when substituted to infrared analysis exhibited acetate absorption bands at 5.8 and 8.1 microns, and a band at 9.6 microns which could be caused by esters containing bulky substituents, i. e., by the acetate group in conjunction with the rest of the molecule.

The tetraacetate, 25 grams, was saponified with 150 cc. of 10% aqueous sodium hydroxide. The aqueous solution was evaporated to dryness and the solids were extracted with hot ethanol. The ethanol was evaporated and the solids were recrystallized from the butanol. The dimethylol decane-1,10-diol was readily soluble in cold water and acetic acid, and insoluble in ethyl acetate, dioxane, tetrahydrofuran, ethylene dichloride, hexane, chloroform and benzene. The dimethylol decane-1,10-diol had a melting point of 59.5 to 61° C.

The above tetraol and tetraacetate products also contained some of the 3-methylol-5-ethylolnonane-1,9-diol isomer, and the acetate derivative thereof, respectively.

Example 2

1,4-butanediol, 601 grams (6.6 moles), 14 grams of copper chromite-nickel dehydrogenation catalyst, 21 grams of tripotassium phosphate and 40 cc. of toluene were stirred and refluxed at 168–179° C. for 10 hours. The water removed amounted to 41.0 cc. From the reaction mixture 244 grams of butanediol was recovered by distillation, leaving a 295 gram residue of crude condensate. In order to eliminate the possibility of cyclic ether formation during acetylation, a trace of zinc chloride (2 grams) was added to the crude condensate; it has been reported (Paul, Compt. Rend., 208, 587 (1939)) that zinc chloride-acetic anhydride quantitatively splits 1,5-oxides. The crude condensate was heated to 150° C. with stirring and 404 grams (4 moles) of acetic anhydride was added over a 2 hour period. The mixture was heated and stirred an additional 2 hours at 145–155° C., then the unreacted anhydride was removed in vacuo. Distillation gave the following fractions:

(1) 145 grams, B. P. 76–80° C./1 mm. Hg of 1,4-butanediol diacetate.
(2) 14 grams, B. P. 128–135° C./1 mm. Hg, $n_D^{25}$ 1.4424.
(3) 95.0 grams, B. P. 150–165° C./1 mm. Hg, $n_D^{25}$ 1.4502–08, the tetraacetylated dimethylol decanediol.
(4) 30 grams, B. P. 175–195° C./1 mm. Hg, $n_D^{25}$ 1.4578.
(5) 130 grams of undistilled residue.

The tetraacetylated dimethyloldecanediol had the same infrared spectrum as the corresponding acetylated product of Example 1. The fact that the presence of zinc chloride does not have an effect upon the product indicates that cyclic ethers are not present in the product.

Example 3

A mixture of 395 grams (5.2 moles) of propylene glycol (1,2-propanediol), 27 grams of tripotassium phosphate, 40 cc. of toluene and 10 grams of 1:1 copper chromite-nickel catalyst was heated at 165–171° C. for 6.5 hours with azeotropic removal of 35.5 cc. of water. Upon distillation, 198 grams of unreacted propylene glycol was recovered. The residue was acetylated by heating with 220 grams of acetic anhydride. The acetylated product was distilled to give:

75.5 grams, B. P. 55–60° C./3 mm., propylene glycol diacetate.
20 grams, B. P. 65–100° C./2 mm.

16 grams, B. P. 111–115° C./2 mm., $n_D^{25}$ 1.441, 1,2,5-hexanetriol triacetate.

7 grams, B. P. 120–125° C./2 mm., $n_D^{25}$ 1.4599.

20 grams residue.

The reaction converted 21.6 weight percent of the propylene glycol into condensation products.

The 1,2,5-hexanetriol triacetate was identical to 1,2,5-hexanetriol triacetate prepared by a different procedure. The condensation of propylene glycol can be represented by:

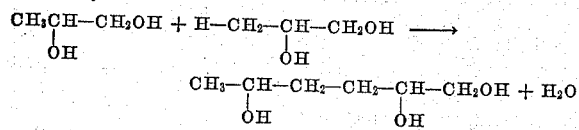

The 1,2,5-hexanetriol triacetate product is saponified to 1,2,5-hexanetriol by the procedure of Example 1, or by any other common saponification procedure.

*Example 4*

The condensation of 1,5-pentanediol, 501 grams, was effected in the presence of 27 grams of tripotassium phosphate, 10 grams of 1:1 copper chromite-nickel catalyst, and 40 cc. of toluene. The reaction was conducted at 166–181° C. for 12 hours with azeotropic removal of 31.5 cc. of water. The amount of unreacted glycol recovered by distillation was 309 grams. A 113 gram portion of the 172 grams of residual material was acetylated with 204 grams of acetic anhydride. The acetylated mixture was distilled to yield the following fractions:

14 grams, B. P. 105–125° C./4 mm. Hg, $n_D^{25}$ 1.4265, 1,5-pentanediol diacetate.

9.5 grams, B. P. 137–178° C./4 mm. Hg.

8.5 grams, B. P. 175–195° C./2 mm. Hg, $n_D^{25}$ 1.4722.

20 grams, B. P. 208–220° C./2 mm. Hg, $n_D^{25}$ 1.4740.

30 grams, B. P. 235–255° C./2 mm. Hg.

26.5 grams, residue, polymerized.

The infrared spectrum of the fraction, B. P. 208–220° C./2 mm. Hg showed strong absorption bands at 5.8 and 8.1 microns which is characteristic of the acetate function. No hydroxyl or olefinic absorption bands were exhibited. A strong band at 9.5–9.6 microns appears to indicate ester (acetate) groups containing large radicals.

The reaction of 1,5-pentanediol, 603 grams, was repeated in the presence of 27 grams of tripotassium phosphate, 10 grams of 1:1 copper chromite-nickel dehydrogenation catalyst and 40 cc. of toluene. The temperature was maintained at 172–189° C. for 12 hours. After distilling 280 grams of unreacted diol, the 275 gram residue was acetylated with 509 grams of acetic anhydride and distilled. The fractions obtained were:

98 grams pentanediol diacetate.

19 grams, B. P. 146–170° C./5 mm. Hg, $n_D^{25}$ 1.4438.

63 grams, B. P. 185–214° C./2 mm. Hg, the greater portion distilling between 193–214° C./2 mm. Hg, $n_D^{25}$ 1.4670–81.

13 grams, B. P. 219–230° C./2 mm. Hg, $n_D^{25}$ 1.4714.

41 grams, B. P. 235–265° C./2 mm. Hg, $n_D^{25}$ 1.4723–28.

87 grams of undistilled residue.

Of the 1,5-pentanediol charged, 36.7 weight percent was converted into condensation products.

*Example 5*

1,5-pentanediol, 501 grams, 26.5 grams of tripotassium phosphate, 10.1 grams of copper chromite-nickel catalyst and 40 cc. of toluene were stirred and refluxed for 12 hours at 161–178° C. Distillation gave 337 grams of recovered pentanediol and 21 grams of 4-hydroxymethyl-1,9-nonanediol boiling at 190–195° C./4 mm. Hg, $n_D^{25}$ 1.4908; $d_4^{20}$ 1.047. The residue in the flask polymerized. This amounted to 125.5 grams.

A 10 gram portion of the 4-hydroxymethyl-1,9-nonanediol, 10 grams, and 15 grams of phenylisocyanate were refluxed in 50 cc. of benzene for 6.5 hours. No solids precipitated on cooling. An equal volume of hexane was added and the mixture was allowed to stand. After two months, a small crop of white crystalline clusters had formed. The tricarbanilate derivative of the 4-hydroxymethyl-1,9-nonanediol, M. P. 71.5–73° C. had the following analysis: Calc'd. for $C_{31}H_{37}N_3O_6$: C, 67.98; H, 6.78. Found: C, 67.85; H, 7.08.

*Example 6*

The reaction of Example 5 was repeated except that the reaction time was 15 hours. Recovered pentanediol amounted to 310 grams. A fraction boiling at 195–203° C./5 mm. was obtained in the amount of 15.6 grams. Distillation was stopped and the residue was taken up in methanol, boiled with Norite A (a decolorizing charcoal) and filtered. The solvent was removed and samples of the distillate and non-distilled residue were submitted to infrared analysis. Both samples exhibited strong hydroxyl absorption bands. They also showed a weak ketonic band due to impurities. Ether linkages were absent in both examples. The absence of ether linkages indicates that both the lower and higher condensates are formed by condensation on the alpha-carbon atom with formation of a carbon-to-carbon bond.

*Example 7*

1,4-butanediol, 250 grams, 14.5 grams of tripotassium phosphate, 31 cc. of toluene and 50 grams of copper chromite-nickel dehydrogenation catalyst were refluxed at 158–170° C. for 12 hours. The butanediol recovered was 163.5 grams. A fraction of B. P. 168–171° C./3 mm. Hg, 3-hydroxymethyl-1,7-heptanediol was obtained. A polymerized residue of 50 grams remained undistilled.

The new alkylol alkanediols of our invention provide a fairly high molecular weight polyhydroxy compound in which no ether or other unstable linkages are present in the intervening structure between the alcoholic groups and in which all of the alcoholic groups are primary. The new alkylol alkanediols are useful as solvents and as antifreeze liquids. The new alkylol alkanediols when esterified with mono-carboxylic organic acids form valuable plasticizers for synthetic resins and plastics, e. g., for polyvinyl chloride; as our polyhydric alcohols have only primary hydroxyl groups, they are superior to those glycols having hydroxyl groups attached directly to the glycol chain, as the primary hydroxyl groups are more stable than the secondary and can be more easily esterified, and the resulting esters give more stable plasticized compositions when mixed with plastics. To produce stable plasticizers, the alkylol alkanediols should have seven or more carbon atoms in the straight chain of the alkanediol. Our new alkylol alkanediols are useful in forming polyesters with polybasic acids such as adipic acid, phthalic acid, or maleic acid. Our alkylol alkanediols can also be mixed with dihydric alcohols, e. g., ethylene glycols, and reacted with the foregoing acids to form modified alkyd resins having a moderate amount of cross-linkage. Our alkylol alkanediols can also be reacted with diisocyanates, particularly hexamethylene diisocyanate or toluene diisocyanate, to form valuable polyurethane resins; the alkanediols can be reacted with dicarboxylic acids, before, during or after such reactions. Our alkylol alkanediols can be reacted with epichlorohydrin to form polyepoxide resins.

Our new esters of alkylol alkanediols, particularly the acetylated alkylol alkanediols, are useful plasticizers for synthetic resins.

Our procedure for preparing the alkylol alkanediols can be varied considerably from the specific procedures of the examples. The Guerbet condensation is a well-known procedure for condensing monohydroxy alcohols, and any of the known Guerbet procedures can be applied in our condensation of polyhydric alcohols having a methylene group attached to a carbinol carbon atom. As catalyst, any inorganic basic substance can be used, alone, or along with a dehydrogenation catalyst. The term "inorganic basic substance" is used to include salts of organic acids, such as sodium acetate, as well as sodium ethoxide, sodium methoxide, etc., in addition to such inorganic bases as sodium hydroxide, calcium oxide, tripotassium phosphate, etc. Any known dehydrogenation catalyst can be used, although metal and metal oxide catalysts are preferred, e. g., nickel, Raney-nickel, palladium, copper, copper chromite, copper oxide and physical mixtures of any of these materials. Preferred inorganic basic substances are the alkali metal and alkaline earth metal oxides, hydroxides, carbonates, bicarbonates, phosphates, silicates and other basic reacting compounds, especially salts thereof. In addition to the basic substance named above, other inorganic basic substances which can be used are potassium hydroxide, calcium oxide, potassium bicarbonate, sodium carbonate, magnesium oxide, sodium metaborate, sodamide, sodium propionate, tricalcium phosphate, potassium butoxide, potassium acid phosphate, sodium metasilicate, sodium orthosilicate, etc. The catalysts can be used in any catalytic amount. For example, 1 to 20 parts of inorganic basic substance for 100 parts by weight of alcohol is usually suitable, and the dehydrogenation catalyst, if present at all, can be used in similar amounts. From 1 to 5 parts of dehydrogenation catalyst per 100 parts by weight of alcohols is usually suitable.

The reaction temperature can vary greatly, depending on the particular catalyst, reaction time and other factors. Temperatures from 125 to 300° C. can be used, but it is preferred to use mild Guerbet conditions in order to avoid degradation reactions; temperatures of the order of 125 to 200° C. are preferred. The reaction time can vary from about 5 to 25 hours, but it is preferred to use 5 to 15 hours. The condensation can be conducted at atmospheric pressure, under autogenous pressure, or under pressure of various gases as understood by those skilled in the art. A more complete statement of the known Guerbet catalysts and reaction conditions, all of which are applicable to the present condensation, is set forth in the copending application of Robert E. Miller, Serial No. 541,053, filed October 17, 1955, now Patent No. 2,836,628.

In the condensation of these viscous glycols, the addition of a small amount of an inert, volatile liquid to the reaction mixture has been found advantageous in promoting a smooth reaction and improving results, by aiding in agitation of the mixture and accelerating the removal of water from the mixture. Any inert water-immiscible liquid having a boiling point of about 60° to 150° C. or the like can be used, e. g., benzene, toluene, heptane, octane, dodecane, etc. or other hydrocarbon or unreactive solvents. If such solvent is used, the amount can be varied considerably, as from any substantial amount, e. g., 2% by weight based upon the alcohol, to much larger amounts, e. g., 50% or more by weight of the reaction mixture. Small amounts, such as 5% to 10% based on the alcohol have been found convenient.

In esterifying our alkylol alkanediols prior to distillation, it is preferred to use low molecular weight esterifying acids in order to keep the boiling point of the resulting ester as low as possible. Such acids as formic, acetic, and propionic acids can be used. For the esterification reaction, it is preferred to use the acid in the form of its anhydride or chloride, e. g., acetic anhydride or acetyl chloride; however, it is possible to use the acid itself in the presence of an esterifying catalyst, e. g., toluenesulfonic acid or hydrochloric acid. Methods of esterifying hydroxyl groups are well known, and any of the known procedures can be used. A convenient procedure is simply to heat the alkylol alkanediol to reflux with excess acetic anhydride for a suitable reaction time, e. g., 2 to 4 hours.

The esters of our alkylol alkanediols can be saponified by any common saponification procedure, for example, by treating with an aqueous or alcoholic basic solution to regenerate the alkylol alkanediols. The use of alkaline solutions such as sodium or calcium hydroxide solutions is preferred. It is also possible to hydrolyze the esters in the presence of dilute acids, but the saponification procedure is preferred.

While our condensation procedure is conducted so that products formed by Guerbet condensation of a small number of molecules can be isolated from the reaction mixture, it is apparent that higher condensates will also be formed, as the alkylol alkanediol product molecules can condense further with each other or with the starting alkanediol. The alkylol alkanediols formed by condensing together 2 or 3 molecules are most useful, although the tetramer molecules are also useful. The usual practice is to separate condensates of 2 to 4 molecules from the reaction mixture. Although there is no particular upper limit on the size of our alkylol alkanediols, the alkanediol straight chain usually contains 7 to 19 carbon atoms.

The process of the present invention is applicable to other glycols than those used in the specific procedures of the examples. For example, other alpha, omega-glycols which can be used are 1,6-hexanediol, 1,8-octanediol, 1,10-decanediol, and 1,12-dodecanediol. These glycols produce the desired products, for example, 1,8-octanediol condenses to produce some 7-methylol-1,15-pentadecanediol.

The invention provides a new class of alkylol alkanediols and esters of such alkylol alkanediols. The invention also provides a novel general procedure for preparing such alkylol alkanediols, and the esters of such alkylol alkanediols.

While certain embodiments of our invention have been set forth, our invention is not limited to these specific embodiments as other embodiments will occur to those skilled in the art.

We claim:

1. As compounds, alpha, omega-alkanediols containing at least seven and no more than nineteen carbon atoms in a straight chain, said alkanediols having at least one alkylol substituent containing no more than eight carbon atoms, all such alkylol substituents being on different carbon atoms, said carbon atoms being non-adjacent to the carbinol carbon atoms of said alkanediol and all of the alcoholic groups in the compounds being primary.

2. The acetic acid esters of the compounds of claim 1.

3. As a compound, 4-methylolnonane-1,9-diol.

4. As compounds, dodecyl tetraols containing only primary alcoholic groups and no quaternary carbon atoms and having an alpha, omega-alkanediol chain of 9 to 10 carbon atoms with methylene groups adjacent to the carbinol carbon atoms of the alkanediol chain.

5. A compound selected from the group consisting of:

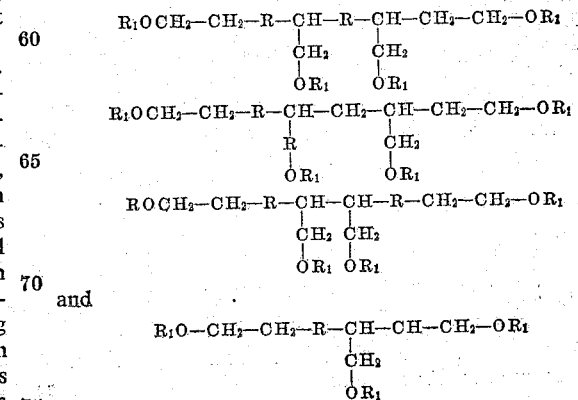

and in which R is an alkylene group of 2 to 4 carbon atoms, and $R_1$ is selected from the group consisting of hydrogen and lower alkanoyl radicals.

6. The method of preparing a polyhydroxy alcohol which comprises heating a glycol containing at least 3 and not more than ten carbon atoms and at least one primary hydroxyl group to 125 to 200° C. in the presence of an inorganic basic substance for 5 to 25 hours with removal of water of reaction, esterifying the polyhydroxy alcohols in the reaction mixture with a lower alkanoyl group, distilling to separate the esters of the desired polyhydroxy alcohols, and hydrolyzing the esters to produce the desired polyhydroxy alcohols.

7. The process of claim 6 in which a dehydrogenation catalyst was also present during the condensation procedure.

8. The process of claim 6 in which a small amount of an inert water-immiscible solvent having a boiling point of about 60 to 150° C. is also present during the heating procedure.

9. The process of claim 6 in which the glycol is 1,2-propanediol.

10. The process of claim 6 in which the glycol is 1,4-butanediol.

11. The process of claim 6 in which the glycol is 1,5-pentanediol.

12. The process of preparing alkylol alkanediols which comprises heating an alpha, omega-alkanediol of 3 to 6 carbon atoms to 125 to 200° C. in the presence of catalytic amounts of an inorganic basic substance and a dehydrogenation catalyst for from 5 to 15 hours with removal of water of reaction, a small amount of an inert water-immiscible solvent of boiling point between 60 to 150° C. also being present, acetylating the resulting alkylol alkanediol product, distilling the acetylated alkylol alkanediol product, and saponifying the acetylated alkylol alkanediol product to regenerate the alkylol alkanediol product.

References Cited in the file of this patent
UNITED STATES PATENTS

| | | |
|---|---|---|
| 1,583,658 | Clarke | May 4, 1926 |
| 2,031,603 | Holt | Feb. 25, 1936 |
| 2,400,724 | Walker | May 21, 1946 |
| 2,692,892 | Hillyer et al. | Oct. 26, 1954 |
| 2,773,895 | Ballard et al. | Dec. 11, 1956 |

OTHER REFERENCES

Weizmann et al.: Chem. and Ind. (1937), pp. 587–91.